United States Patent [19]
Garrett et al.

[11] Patent Number: 5,745,634
[45] Date of Patent: Apr. 28, 1998

[54] VOLTAGE CONTROLLED ATTENUATOR

[75] Inventors: Carey Marcel Garrett, Kanata; Chenjun Fan, Nepean; Darko Cugalj, St. Ottawa; David Gransden, Nepean, all of Canada

[73] Assignee: JDS Fitel Inc., Nepean, Canada

[21] Appl. No.: 685,620

[22] Filed: Jul. 24, 1996

[51] Int. Cl.$^6$ ............................................. G02B 6/32
[52] U.S. Cl. ........................................ 385/140; 385/33
[58] Field of Search ............................. 385/140, 33, 36, 385/35

[56] References Cited

U.S. PATENT DOCUMENTS

| | | | |
|---|---|---|---|
| 3,714,430 | 1/1973 | Finvold et al. | 359/890 |
| 5,325,459 | 6/1994 | Schmidt | 385/140 |
| 5,589,933 | 12/1996 | Osgood et al. | 356/73.1 |

FOREIGN PATENT DOCUMENTS

| | | | |
|---|---|---|---|
| 54-58453 | 5/1979 | Japan | 385/140 |
| 5-323214 | 12/1993 | Japan | 385/140 |

*Primary Examiner*—John Ngo
*Attorney, Agent, or Firm*—Neil Teitelbaum and Associates

[57] ABSTRACT

A voltage controlled attenuator for an optical telecommunication system comprises an optical attenuator placed between an input and an output lens for obstructing the path of an incoming light beam. The attenuator has variable attenuation (reflection, absorption, etc.) which is controlled for maintaining a preset power of the outgoing light beam. To this end, a fraction of the outgoing signal is diverted to an output detector by reflecting off an end face of a lens, and processed for obtaining a control signal representative of the output power. The control signal actuates a dc motor which displaces the attenuator to a position corresponding to a preset output power.

25 Claims, 4 Drawing Sheets

5,745,634

VOLTAGE CONTROLLED ATTENUATOR

FIELD OF THE INVENTION

This invention relates to an optical attenuator for a fiber optic telecommunication system, and is particularly concerned with a compact voltage controlled attenuator with one or more taps for power monitoring and/or power equalization.

BACKGROUND OF THE INVENTION

A receiver of a fiber optic telecommunication system typically is able to function optimally when incoming signals are within a predetermined signal level range. The signal power can not be too low, neither too high, and is a function of the transmitter output, fiber attenuation, and receiver sensitivity. Attenuation devices are frequently used for adapting the path attenuation to the receivers optimum function.

Conventional mechanical attenuation devices are often inserted as a plug into the transmission fiber and adjusted mechanically to provide a particular amount of attenuation. Variable attenuators are generally used for compensating for aging optical components, in that they provide several graduated attenuation values between a minimum and a maximum.

These attenuating devices should be designed to have the lowest possible back reflection. Reflection of the outgoing signal back to the transmitter could lead to feedback noise and can deteriorate the quality of the transmission. All other environmental factors such as temperature changes, polarization changes, vibration, humidity, must be effectively compensated for by the attenuation device.

U.S. Pat. No. 5,311,613 (issued on May 10, 1994, to Kabelmetal Electro GmbH), describes an optical attenuation device comprising a fusion coupler with an inlet, an outlet, and at least one other inlet or outlet is closed off reflection-free. The manufacturing of such plug-type attenuators are relatively costly and the attenuation factor can be varied only by the couplers coupling ratio.

U.S. Pat. No. 5,325,459 (issued on Jun. 28, 1994, to Hewlett-Packard), discloses a wedge-shaped attenuator with an attenuation disk, a corner cube, a prism, a collimating and a focusing lens. The path is designed so that the outgoing beam has a parallel offset relative to the incoming beam, and the outgoing beam is always in the same direction at all angular orientations of the attenuator. The attenuation disk has a selected cross-section whereby the thickness of the light absorbing material increases along the cross-section. The attenuation can be continuously tuned by rotating the disk.

It is also known to obtain a variable attenuation by coating a filter element with an attenuation layer having a variable density. However, the application of such a coating requires a high degree of accuracy and the layer may exfoliate when the device is used for high intensity light beams.

There is a need to attenuate the intensity level of the light transmitted along the fiber in a manner which provides a compact arrangement and provides a variable attenuation with a low component count.

SUMMARY OF THE INVENTION

It is an object of the present invention to provide an improved variable attenuator in a compact arrangement, which provides a controllable attenuation and wherein the effects of the back reflection are reduced or eliminated.

Accordingly, the invention provides an attenuating device comprising: a first lens for receiving an incoming light beam and for directing the light beam along a first beam path; a second lens disposed along the first beam path having an input face arranged so that substantially most of the light beam incident upon the input face passes therethrough the second lens as an outgoing light beam, while a smaller, predetermined portion of the light beam is reflected off an end face along a reflected beam path; optical detection means disposed to receive the predetermined portion for detecting the intensity of the predetermined portion; and controllable attenuating means located between the first lens and the second lens, and being in or movable in the optical path for varying the attenuation of the outgoing light beam.

According to another aspect of the invention, a miniature package is disclosed comprising: a first lens for receiving an incoming light beam and for transmitting a light beam along a first beam path; a second lens disposed along the first beam path for receiving the light beam and reflecting a small fraction of the light beam off an end face along a second beam path; optical detection means disposed in the second path for receiving the fraction and detecting the intensity of the fraction; controllable attenuating means arranged in the first path for attenuating the intensity of the light beam; a dc motor receiving the control signal and accordingly rotating a central shaft; a disk fixed to the central shaft for rotation therewith and having a pin fixed on the surface of the disk; a lever with a first end coupled to the pin and hinged at the other end; and means for attaching the optical attenuator to the lever for moving the attenuating means. The invention also provides for an optical attenuator for integration into an optical fiber transmission system comprising: an input lens for receiving an incoming light beam at an input end and transmitting a collimated beam at an output end; an attenuating element placed in the path of the collimated beam for providing an attenuated light beam; an output lens provided with reflective means for receiving the attenuated beam, transmitting an outgoing light beam and reflecting a fraction of the outgoing light beam; and driving means for displacing the attenuating element to a target position in response to a control signal obtained from the fraction.

Advantageously, according to the present invention the attenuation can be continuously adjusted over a broad range. Desired attenuation factors can be obtained quickly and with high repeatability in the adjustment of the attenuation. The device is also polarization independent and minimizes unwanted back reflections.

BRIEF DESCRIPTION OF THE DRAWINGS

Exemplary embodiments of the present invention will now be described will be further understood from the following description with reference to the drawings in which.

DETAILED DESCRIPTION

Figure 1:
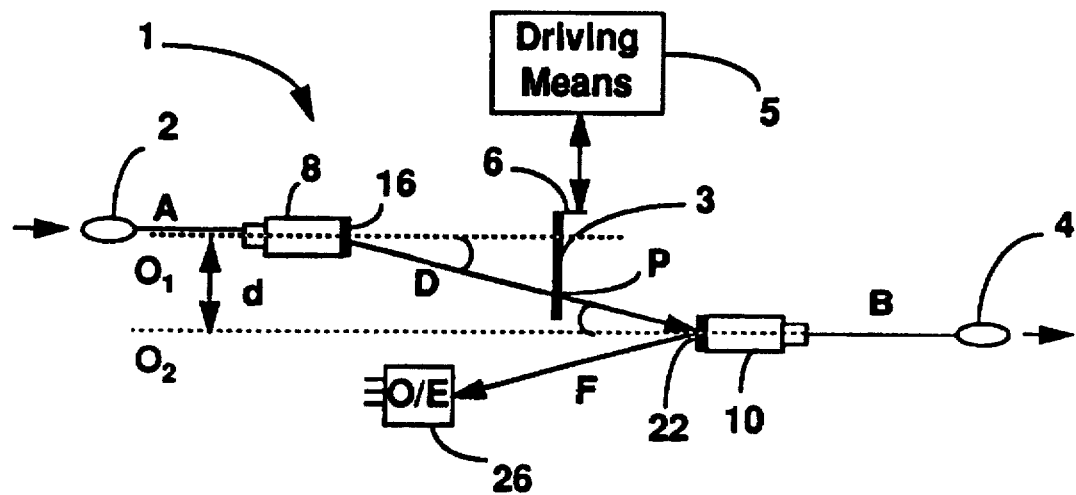
FIG. 1 shows a block diagram of an voltage controlled attenuator (VCA)

FIG. 1 is a block diagram of the VCA with the input port 2 and output port 4 arranged on opposite sides of the mounting base. VCA 1 is connected in the fiber optic path through ports 2 and 4. Input lens 8 in the form of a graded index (GRIN) lens receives an incoming light beam A from input port 2 and output lens 10 provides an outgoing light beam B at port 4.

One of the most ubiquitous building blocks used in the design and manufacture of optical elements is the GRIN lens. Lens of this type are produced under the trade name "SELFOC"; the mark is registered in Japan and owned by the Nippon Sheet and Glass Co. Ltd. GRIN lens in combination with other optical elements are used in the manufacture of WDM devices, optical couplers, circulators, isolators, and other devices. The use of a GRIN lens in this invention provides a number of advantages over other conventional lenses. For example, GRIN lenses are relatively inexpensive, compact, and furthermore have parallel flat end faces. In particular, the flat end face of the GRIN lens allows a single lens to be used as a means of collimating or focusing the light, and as well, as a means of tapping light reflected from the end face of the lens.

In reference to FIG. 1, the main light beam D exits lens 8 at an angle $\alpha$ relative to the optical axis $O_1$ of the lens 8. Beam D forms an angle $\beta$ with the input end 22 of the output lens 10. Output lens 10 transmits the outgoing signal B to port 4 along optical axis $O_2$ which is parallel with axis $O_1$ of the lens 8 and offset by distance "d".

The output lens 10 has a coating with approximately 3.5% reflectivity. Signal F is reflected at the input end 22 of the output lens 10 and represents a fraction of the optical light beam E. Signal F is input to an O/E detector 26 for monitoring the intensity of the outgoing light beam. Conveniently, by providing a coating on the input face of the output GRIN lens 10 an inexpensive tap is provided.

Figure 2A:
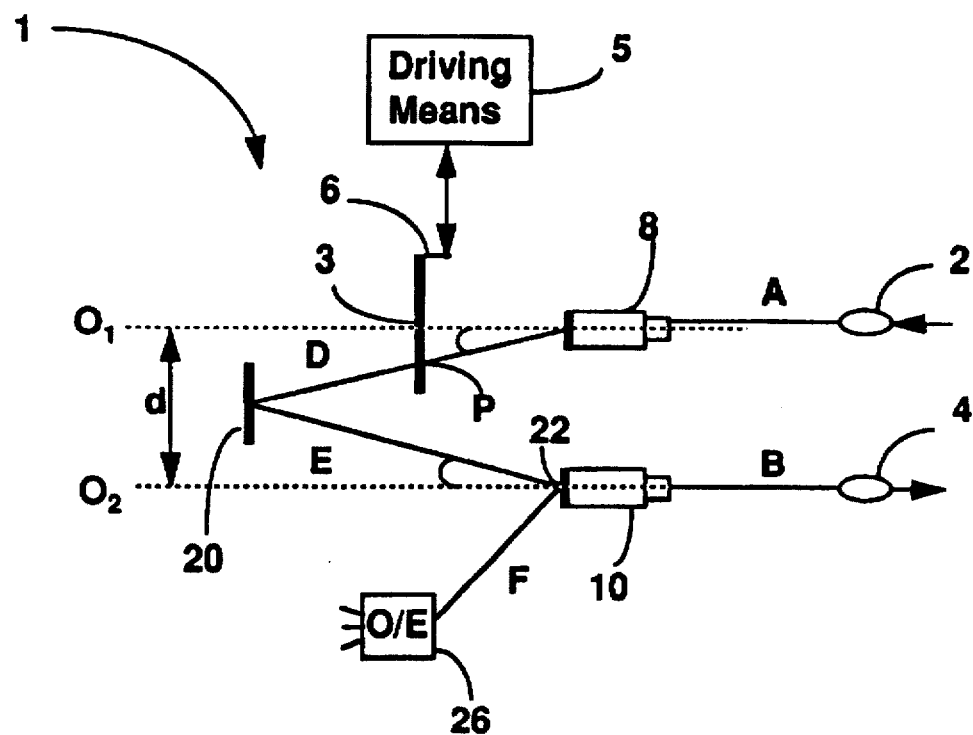
FIG. 2A illustrates a block diagram of a voltage controlled attenuator (VCA) according to this invention.

FIG. 2A is a block diagram of a voltage controlled attenuator (VCA) 1 according to this invention connected in the fiber optic path in a variant with the fibers 2 and 4 arranged on the same side of the mounting base (not shown) of the attenuator. The arrangement of both input and output ports on one side of the mounting base provides for an easy to install compact VCA package.

VCA 1 is provided with an input lens 8 which receives an incoming optical light beam A from input port 2 and transmits a collimated beam D. An output lens 10 receives a light beam E and provides a focused outgoing light beam B at port 4.

Optical attenuator 3 is placed in the path of light beam D, between lens 8 and a reflecting mirror 20. Optical attenuator 3 has a variable attenuation. The point of incidence P of beam D on optical attenuator 3 is established by the system for obtaining a preset intensity of the outgoing light beam B. To this end, attenuating element 3 is attached to driving means 5 with any appropriate attaching means 6, and displaced in a position corresponding to the preset intensity of the outgoing light beam, as it will be explained later.

The attenuated light beam D is then reflected by mirror 20 and the input face 22 of output lens. Output lens 10 focuses the outgoing light beam B and transmits it to output fiber 4.

Input face 22 of output lens 10 reflects a fraction F of the outgoing light beam to output detector 26, which is used for monitoring the intensity of the outgoing light beam B. This may be obtained by applying a reflective coating with, for example, approximately 3.5% reflectivity on face 22, such that about 3.5% to 4% of the outgoing optical beam B is reflected to detector 26. The advantage of using this folded configuration is that the device is substantially miniaturized and input and output fibers are conveniently on one side of the device.

Figure 2B:
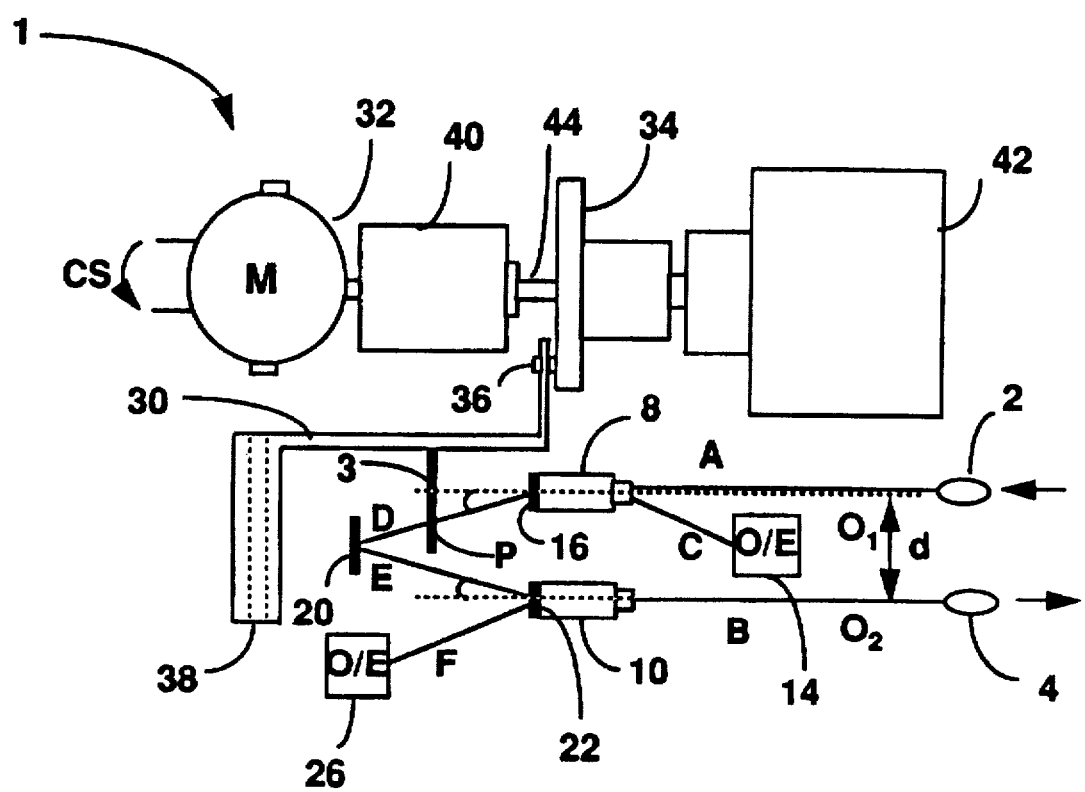
FIG. 2B illustrates the embodiment of the VCA of FIG. 2A in further details.

FIG. 2B illustrates the embodiment of the VCA of FIG. 2A in further detail, and also includes an input power detector 14. In this embodiment, output face 16 of input lens 8 is provided with means for reflecting a fraction C of the incoming light beam A, if the intensity of the incoming light needs to be measured. The main light beam, which was denoted with D in FIG. 1, is transmitted through lens 8. Fraction C may also be obtained by using a reflective coating with approximately 3.5% reflectivity. In this way, about 3.5% to 4% of the incoming light beam A is diverted to an optical/electrical (O/E) detector 14 for conversion to an input electrical signal, in accordance with known techniques. An InGaAs photodiode may, for example, be used as the input monitoring detector.

Element 3 may be an optical filter with monotonically variable attenuation, as for example a neutral density filter or a wedge shaped filter. The attenuation is adjustable from zero to a predetermined upper value dependent upon the characteristics of the filter.

The embodiment of driving means 5 illustrated in FIG. 2A comprises a dc motor 32 and a disk 34 rotated by the central shaft 44 of the motor 32. A pin 36 is fixed on the surface of disk 34 and is adapted to receive an end of a lever 30. The end of lever 30 is displaced by pin 36 when the disk rotates about shaft 44. The other end of lever 30 is hinged as shown by reference numeral 38. Optical attenuator 3 is attached to lever 30.

A control circuit (not shown) compares the intensity of the outgoing light beam with the preset value, and the DC motor 32 is inputted with a feedback signal (CS) for adjusting the position of the filter 3. Signal CS is obtained by comparing the intensity of the outgoing beam with a preset value, or may be obtained by comparing the intensity of the outgoing beam with the intensity of the incoming signal.

When motor 32 rotates shaft 44, pin 36 pushes lever 30 and the optical attenuator 3 changes its position in the path of light beam D. By displacing filter 3, having variable attenuation characteristics, in the path of the light beam D, the attenuation can be continuously and precisely varied, therefore maintaining a stabilized known power of the outgoing light beam.

Element 32 may be a dc motor with or without gear reduction, a step motor with or without gear reduction, a translation stage driven by a step motor, a galvanometer type mechanism in which the angle of rotation depends upon the voltage applied, or a coil generating a variable magnetic field. The dc motor 32 is preferably a step motor provided with a 100:1 reduction gear box 40 for rotating disk 34 with small increments.

Lever 30 is spring loaded for maintaining a constant pressure on disk 34 to reduce backlash and to decrease sensitivity to shock. The use of 100:1 gearbox 40 allows the motor itself to make relatively large movements while moving the filter very precisely (0.01 dB steps). Disk 34 is notched on shaft 44 and physical stops are provided so that the motor can not turn far enough to move the filter out of its monotonically variable attenuation range. Disk 34 is also connected to a small potentiometer 42 to give a voltage readout of the filter position. As indicated above, this arrangement of both input and output ports on one side of the mounting base provides for an easy installation and a compact package device.

Figure 3A:
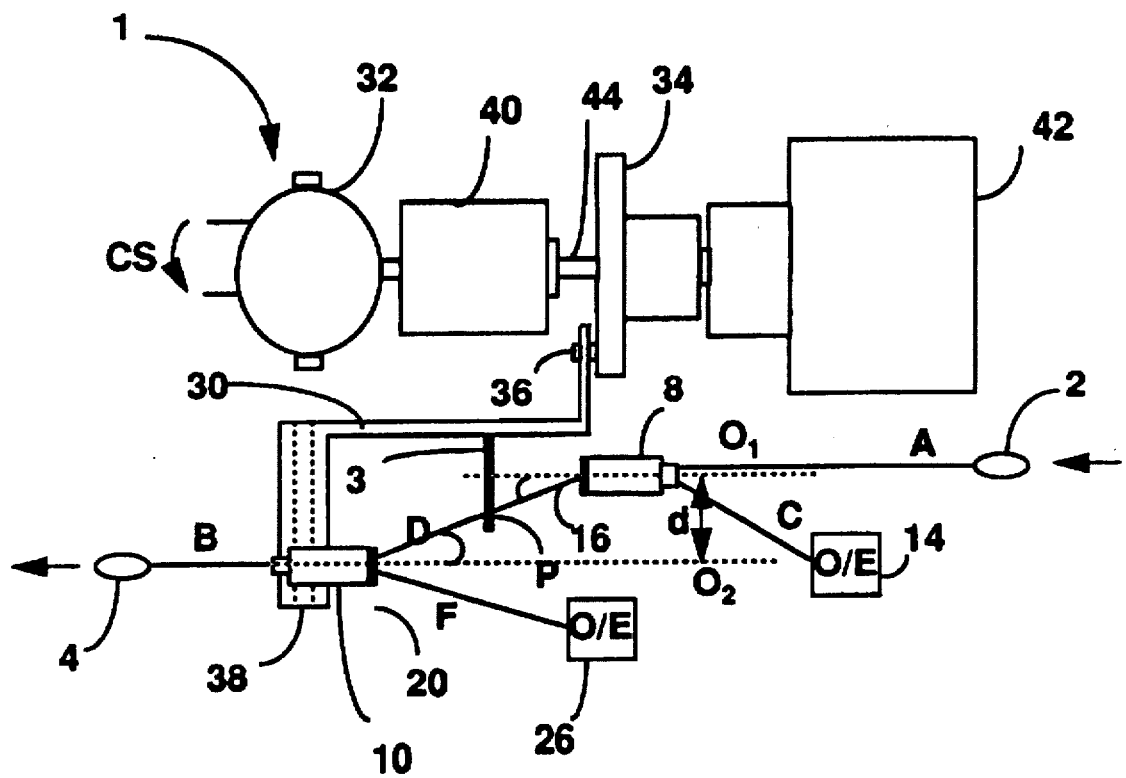
FIG. 3A is a block diagram of another embodiment of the VCA.

FIG. 3A illustrates the embodiment of VCA 1 of FIG. 1 in further details, and additionally provided with an input power detector 14.

Figure 3B:
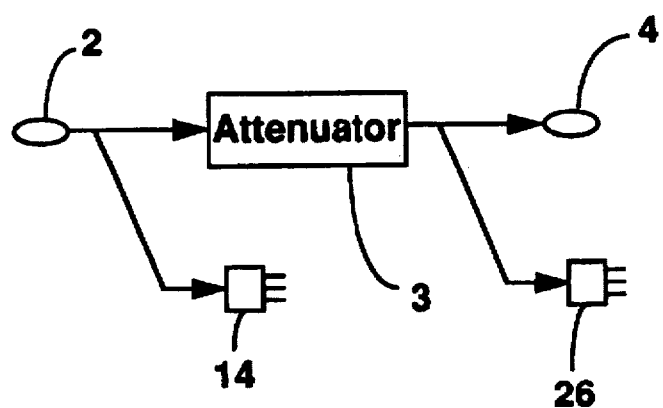
FIG. 3B is an equivalent circuit of an optical attenuator.

FIG. 3B is an equivalent circuit of an optical attenuator. An attenuator element 3 is inserted into the transmission fiber between an input optical connector 2 and output optical connector 4 and displaced into a target position to provide a certain attenuation. The attenuation is controlled by displacing the attenuator according to a control signal obtained by comparing the intensity of the output light beam with a preset value. In addition, the intensity of the incoming light beam may be measured, in which case the control signal is obtained as a function of both input and output measurements. The measurement is performed using known techniques, as for example taping a small fraction of the incoming and the outgoing light beams, converting the respective fractions into electrical signals and determining the power value. FIG. 3B illustrates the input power detector 14 and the output power detector 26.

Figure 4:
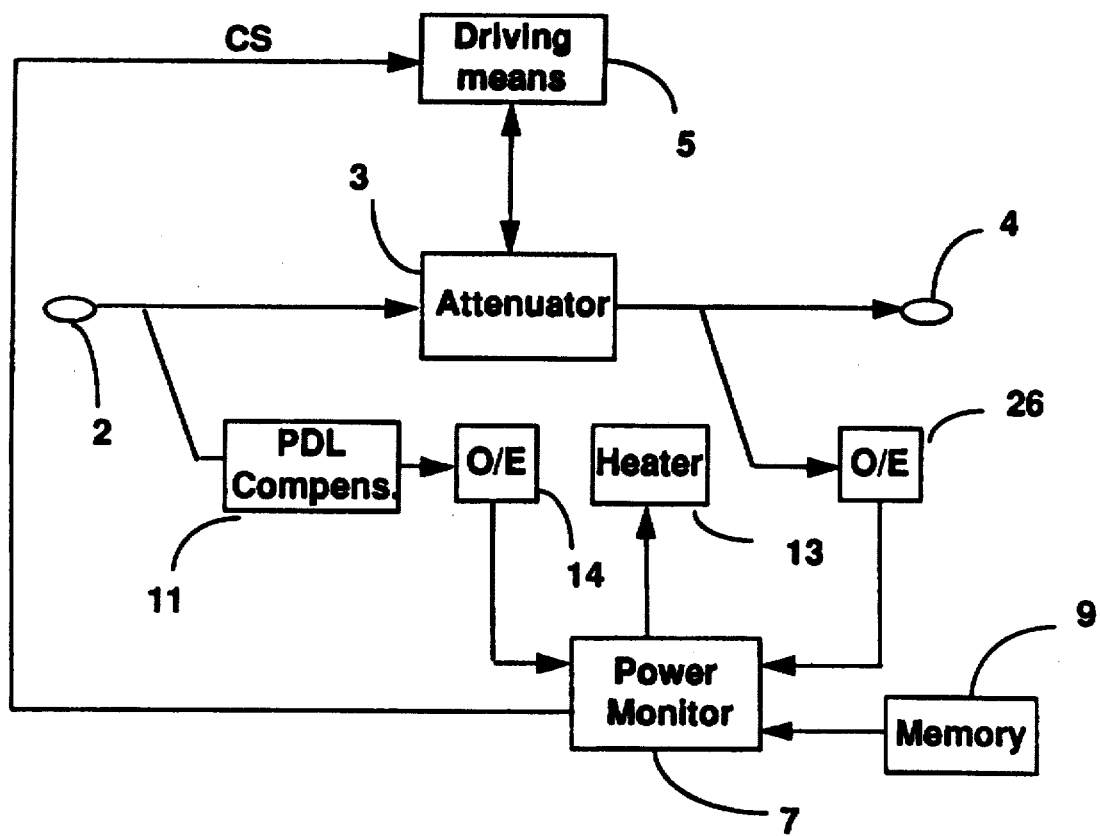
FIG. 4 shows a block diagram of the attenuator connected to the external circuitry.

FIG. 4 shows a block diagram of the attenuator connected to the external circuitry. The incoming beam A is received by lens 8 and fraction C is applied to input detector 14 for determining the power of the incoming signal. The attenuating filter 3 is placed in the path of beam D exiting lens 8, and is adjustable from zero to a predetermined upper value. Fraction F of the outgoing signal is applied to output detector 14 for determining the power of the outgoing light beam. The optical signals C and F received by the detectors 14 and 26 respectively, are processed into voltages indicative of the power of the incoming and outgoing beams. A monitoring circuit 7 receives the provisioned values for the intensity of the outgoing light beam from memory 9 and the measured power signals to produce control signal CS. Control signal CS is applied to driving means 5 as a feedback signal for adjusting the position of the attenuator 3. By displacing the attenuator in the path of the light beam, the attenuation can be continuously and precisely varied, therefore maintaining a stabilized known power of the outgoing light beam.

A factor that should be accounted for in designing VCA 1 is polarization dependent loss (PDL), which may affect the tracking error suffered by detector 26. A PDL compensation technique should be used to maintain PDL tracking error less than 0.1 dB. FIG. 4 illustrates PDL compensating block 11 used to this end for adjusting the control signal CS.

Still another factor is the condensation on the optics under humidity which may affect the insertion loss and detector accuracy. Condensation on the optics may adversely affect the insertion loss, the tap detector accuracy, and the tracking error. To prevent condensation on the optics a heater 13 powered by a constant current is placed in the optics area, so that the temperature of the optics will always be a few degrees higher than the surrounding areas temperature.

While the invention has been described with reference to particular example embodiments, further modifications and improvements which will occur to those skilled in the art, may be made within the purview of the appended claims, without departing from the scope of the invention in its broader aspect.

What we claim is:

1. An attenuating device comprising:

a first lens for receiving an incoming light beam and for directing said light beam along a first beam path;

a second lens disposed along said first beam path having an input face arranged so that substantially most of said light beam incident upon said input face passes therethrough said second lens as an outgoing light beam, while a smaller, predetermined portion of said light beam is reflected off an end face thereof along a reflected beam path;

optical detection means disposed to receive said predetermined portion for detecting the intensity of said predetermined portion; and controllable attenuating means located between said first lens and said second lens, and being in or movable in said optical path for varying the attenuation of said outgoing light beam.

2. An attenuating device as in claim 1, wherein said optical detection means is an output optical detector for receiving said reflected beam and converting same into an electrical signal.

3. An attenuating device as in claim 2, further comprising control means for comparing said electrical signal with a provisioned signal and for generating a control signal.

4. An attenuating device as in claim 1, wherein said controllable attenuating means comprises:

an optical attenuator; and means for driving said optical attenuator into said beam path, and wherein at least the second lens is a GRIN lens.

5. An attenuating device as claimed in claim 4, wherein said means for driving comprises:

a dc motor for receiving said control signal and rotating a central shaft accordingly;

a disk fixed to said central shaft for rotation therewith and having a pin fixed on the surface of said disk;

a lever with a first end coupled to said pin and hinged at the other end; and means for attaching said optical attenuator to said lever for placing said optical attenuator into a target position corresponding to said control signal.

6. An attenuating element as defined in claim 5, wherein the attenuating element is directly attached to the disk or the central shaft and is rotatable through said beam.

7. An attenuating device as in claim 4, wherein said optical attenuator is a filter with monotonically variable attenuation.

8. An attenuating device as in claim 4, wherein said optical attenuator is an opaque element filter movable in the optical path of the beam.

9. An attenuating device as in claim 5, further comprising a reduction box coupled to said motor shaft.

10. An attenuating device as in claim 5, further comprising a potentiometer coupled to said shaft and calibrated to give a readout of the position of said optical attenuator.

11. An attenuating device as in claim 5, wherein said disk is provided with a first notch having a first stop for limiting the displacement of said optical attenuator to a first position corresponding to a minimum attenuation.

12. An attenuating device as in claim 5, wherein said disk is provided with a second notch having a second stop for limiting the displacement of said optical attenuator to a second position corresponding to a maximum attenuation.

13. An attenuating device as in claim 5, wherein said lever is provided with resilient coupling means at said first and said second end.

14. An attentuating device as in claim 4, wherein said optical attenuator is maintained in a target position for providing a predetermined intensity of said outgoing light beam.

15. An attenuating device as in claim 1, wherein said end face of said second lens is coated to reflect said smaller predetermined portion of said light beam.

16. An attenuating device as in claim 15, wherein said coating is substantially wavelength independent.

17. An attenuating device as in claim 1, wherein said first lens has an end face coated to reflect a known portion of said incoming light beam to an input detector.

18. An attenuating device as in claim 17, wherein said coating is substantially wavelength independent.

19. A miniature package comprising:
   a first lens for receiving an incoming light beam and for transmitting a light beam along a first beam path;
   a second lens disposed along said first beam path for receiving said light beam and reflecting a small fraction of said light beam off said input face along a second beam path;
   optical detection means disposed in said second path for receiving said fraction and detecting the intensity of said fraction; controllable attenuating means arranged in said first path for attenuating the intensity of said light beam;
   a dc motor receiving said control signal and rotating a central shaft accordingly;
   a disk fixed to said central shaft for rotation therewith and having a pin fixed on the surface of said disk;
   a lever with a first end coupled to said pin and hinged at the other end; and
   means for attaching said optical attenuator to said lever for moving said attenuating means.

20. A package as in claim 19, further comprising:
   a mounting base;
   means for supporting said dc motor; and
   means for fixing said input and output lens on opposed sides of said mounting base.

21. A package as claimed in claim 19, further comprising:
   a mounting base;
   means for supporting said dc motor;
   means for fixing said input and output lens on opposed sides of said mounting base; and
   a mirror placed in said first optical path for directing said light beam from said attenuating means to an input end of said second lens.

22. An optical attenuator for integration into an optical fiber transmission system comprising:
   an input lens for receiving an incoming light beam at an input end and transmitting a collimated beam at an output end;
   an attenuating element placed in or movable in the path of said collimated beam for providing an attenuated light beam;
   an output lens for receiving said attenuated beam, transmitting an outgoing light beam, said output lens being provided with reflective means for reflecting a predetermined fraction of said outgoing light beam; and
   driving means for displacing said attenuating element to a target position in response to a control signal obtained from said fraction.

23. An attenuator as claimed in claim 22, further comprising:
   an output power detector for receiving said fraction and converting same into an electrical signal;
   means for providing said electrical signal to a power monitoring unit for generating said control signal.

24. An attenuator as claimed in claim 22, further comprising a mounting base and means for fixing said driving means and said input lens and said output lens, wherein said input and said output lens are mounted on a same side of said mounting base.

25. An attenuator as claimed in claim 23, further comprising means for supporting said output power detector on said mounting base.

* * * * *